No. 749,380. PATENTED JAN. 12, 1904.
G. W. HAZEL.
TRAP.
APPLICATION FILED FEB. 9, 1903.
NO MODEL.

WITNESSES:
F. C. Larson
W. E. Windsor

INVENTOR:
George W. Hazel
BY Geo. W. Sues.
Attorney

No. 749,380. Patented January 12, 1904.

UNITED STATES PATENT OFFICE.

GEORGE W. HAZEL, OF AURORA, ILLINOIS.

TRAP.

SPECIFICATION forming part of Letters Patent No. 749,380, dated January 12, 1904.

Application filed February 9, 1903. Serial No. 142,476. (No model.)

*To all whom it may concern:*

Be it known that I, GEORGE W. HAZEL, residing at Aurora, in the county of Kane and State of Illinois, have invented certain useful Improvements in Traps; and I do hereby declare that the following is a full, clear, and exact description thereof, such as will enable others skilled in the art to which it appertains to make and use the same, reference being had to the accompanying drawings, which form a part of this specification.

The invention relates to a new and novel improvement in traps.

The object of my invention is to provide a trap comprising a supporting-frame, and this supporting-frame pivotally holds a bait-holding tread or platform, and this tread or platform is provided with a spring-actuated jaw, this jaw when the trap is set being engaged by a detent, so that any animal coming in contact with the trigger-held bait-holding tread or platform will release the same from the detent, permitting the spring-actuated jaw to close upon the tread or platform to trap the animal, as will be described more fully hereinafter.

Figure 1:
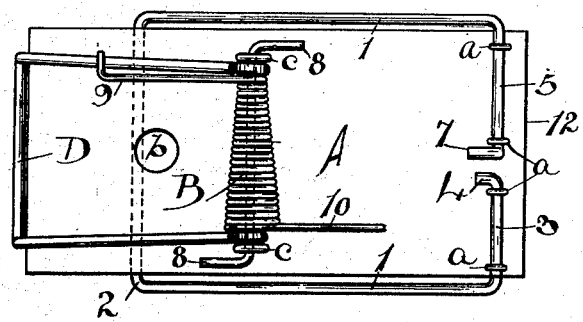
Figure 2:
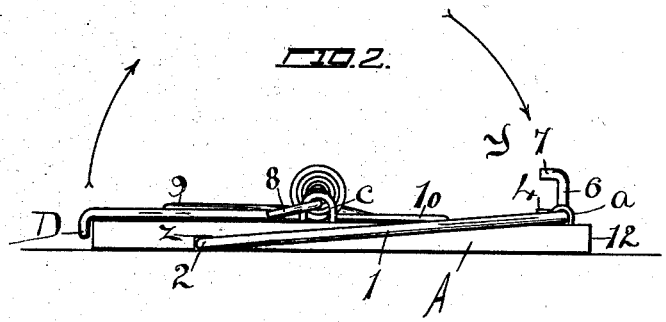

In the accompanying drawings I have shown in Figure 1 a top view of a trap embodying my invention. Fig. 2 shows a side elevation of my trap, disclosing the same as sprung, this being the normal condition of the trap, while Fig. 3 discloses the trap as set.

Figure 3:
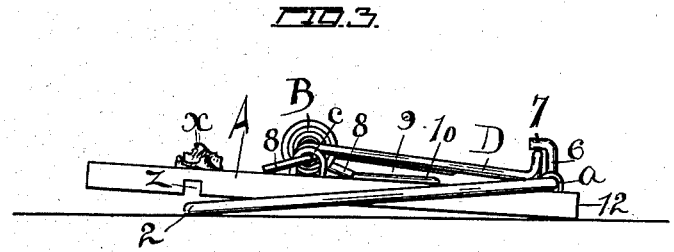

In carrying out the aim of my invention I provide a rectangular supporting-frame, preferably made of wire and comprising the two side members 1, the transverse member 2, the inwardly-extending end member 3, ending in the ear 4, and the inwardly-extending end member 5, which member continues upward to form the stem 6, as disclosed in Figs. 2 and 3, terminating in the detent 7, extending forward, as shown.

Pivotally secured to the end members 3 and 5 by means of suitable staples *a* is a bait-holding tread or platform A, which may be of wood, sheet metal, or any other suitable material, and is of a suitable length and width. At one end this pivotally-held tread or platform A is provided with a recess *b*, adapted to hold the bait as disclosed in Fig. 3, where the bait *x* is shown, the trap being set.

The supporting-frame 1 is preferably made of wire, permitting a free movement of the tread or platform A, and in its normal condition by virtue of its weight the tread or platform rests upon its own base, as disclosed in Fig. 2, the tread or platform being provided below with a suitable groove *z*, within which is held the transverse frame portion 2, as disclosed in Fig. 2.

Referring to Fig. 1, it will be noted that the tread or platform is pivotally secured at one of its ends to the end members 5 and 3 of the supporting-frame. The movement of the supporting-frame in one direction is controlled by the tread or platform A, the frame working into the slot *z*, while the movement of the bait-holding tread or platform in the opposite direction is controlled by means of the ear 4, so that but a slight rocking movement is permitted the tread A.

Secured to the tread or platform A by means of the staples *c* is a (preferably wire) stem 8, which stem supports an ordinary coil-spring B, which spring is provided with the terminations 9 and 10, extending in opposite directions, as is disclosed in Fig. 1.

Pivotally secured to the stem 8 is an approximately U-shaped jaw D, which jaw freely works upon the stem 8, the spring end or termination 9 being normally in engagement with this jaw to force the same downward into and in engagement with the tread or platform. In the drawings it will be noticed that I have bent the jaw D downward at the forward end, so that the jaw overlaps the end of the tread or platform.

Now the jaw D is of such a length that when the trap is set the same may be brought adjacent to and below the detent 7. In carrying the jaw D backward, however, and bringing the same in engagement with the tread or platform A the jaw D would pass by and escape the detent. In Fig. 2 I have shown in the dotted lines at *y* an arc disclosing the path of the jaw D when the same is carried downward. Now in order to bring this jaw D below the detent 7 it is necessary to tilt upward the tread or platform A, so as to carry the jaw D below the detent 7. As the jaw is normally spring-pressed, it comes under spring-contact in engagement below the detent, and so holds the tread or platform at an angle to the base or floor upon which the trap is set, as disclosed in Fig. 3.

Now the tension of the spring B and the weight of the tread or platform A are so gaged that any perceptible weight added to or coming upon the tread or platform A will cause this tread or platform to drop, during which the jaw D will escape from below the detent, permitting the springing and closing of the trap.

In Fig. 3 I have disclosed the tread or platform and frame both in engagement with the base or floor at one end. It should be understood, however, that the tread or platform may be entirely supported upon the frame, which can be made rectangular, so that the end members 3 and 5 can be secured to the tread or platform either at the end 12 of the tread or platform or be secured below the same. Merely for the sake of convenience do I secure the supporting-frame at one end to the top of the tread or platform.

Now, having thus described my said invention, what I claim as new, and desire to secure by United States Letters Patent, is—

1. In a trap, the combination with a rectangular supporting-frame provided at one of its ends with inwardly-extending members one of which terminates in an ear, the other member having an upwardly-extending detent formed thereon, of a platform tiltably connected to said supporting-frame and adapted to contact with the ear of the supporting-frame to limit movement of the platform on said frame, and a spring-actuated jaw carried by the platform and adapted to be engaged with said detent to be held by the latter when the platform is tilted upon the supporting-frame.

2. In a trap, the combination with a rectangular supporting-frame provided at one of its ends with inwardly-extending members one of which terminates in an ear, the other member having an upwardly-extending detent formed thereon, of a platform tiltably connected to said supporting-frame and adapted to contact with the ear of the supporting-frame to limit movement of the platform on said frame, and a spring-actuated jaw carried by the platform and adapted to be engaged with said detent to be held by the latter when the platform is tilted upon the supporting-frame, said platform having a transverse groove at its under side to receive the end of the supporting-frame opposite to the inwardly-extending members thereof when the jaw is released from engagement with the detent.

In testimony whereof I affix my signature in presence of two witnesses.

GEORGE W. HAZEL.

Witnesses:
 HARRY NOTT,
 META SANDS.